(12) United States Patent
Eisa et al.

(10) Patent No.: US 10,697,407 B2
(45) Date of Patent: Jun. 30, 2020

(54) METHOD AND SYSTEMS FOR A MULTISTAGE EXHAUST GAS COOLER

(71) Applicant: Transportation IP Holdings, LLP, Norwalk, CT (US)

(72) Inventors: Hafiz Hassan Eisa, Brookfield, WI (US); Pradheepram Ottikkutti, Erie, PA (US); Paul Lloyd Flynn, Lawrence Park, PA (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 0 days.

(21) Appl. No.: 15/973,299

(22) Filed: May 7, 2018

(65) Prior Publication Data

US 2018/0291845 A1    Oct. 11, 2018

Related U.S. Application Data

(63) Continuation of application No. PCT/US2018/026395, filed on Apr. 6, 2018.

(60) Provisional application No. 62/482,303, filed on Apr. 6, 2017.

(51) Int. Cl.

| F02M 26/33 | (2016.01) |
| F02M 26/32 | (2016.01) |
| F02M 26/28 | (2016.01) |
| F01N 3/04 | (2006.01) |
| F02M 26/24 | (2016.01) |

(52) U.S. Cl.
CPC ............ *F02M 26/33* (2016.02); *F01N 3/043* (2013.01); *F02M 26/24* (2016.02); *F02M 26/28* (2016.02); *F02M 26/32* (2016.02)

(58) Field of Classification Search
CPC combination set(s) only.
See application file for complete search history.

(56) References Cited

U.S. PATENT DOCUMENTS

| 4,289,198 A | 9/1981 | Young |
| 4,597,687 A | 7/1986 | Colas |
| 5,755,280 A | 5/1998 | de Costa et al. |
| 7,162,987 B2 * | 1/2007 | Bourgault ............. F01M 5/021 123/142.5 R |
| 7,987,836 B2 | 8/2011 | Kurtz et al. |

(Continued)

FOREIGN PATENT DOCUMENTS

JP    2001173519 A    6/2001

OTHER PUBLICATIONS

International Bureau of WIPO, International Preliminary Report on Patentability Issued in Application No. PCT/US2018/026395, dated Oct. 8, 2019, WIPO, 10 pages.

*Primary Examiner* — Binh Q Tran
(74) *Attorney, Agent, or Firm* — McCoy Russell LLP

(57) ABSTRACT

Various methods and systems are provided for an exhaust gas cooler. In one example, a method includes controlling a flow of coolant to at least a first stage of a plurality of stages of an exhaust gas cooler relative to a second stage of the plurality of stages to maintain at least one of: a controlled amount of heat removal from the first stage relative to the second stage, an about equal coolant temperature increase across the first stage relative to the second stage; an about equal gas temperature decrease across the first stage relative to the second stage; and an about equal gas heat removal across the first stage relative to the second stage.

20 Claims, 8 Drawing Sheets

(56) References Cited

U.S. PATENT DOCUMENTS

| | | | |
|---|---|---|---|
| 8,627,882 B2 | 1/2014 | Schmidt et al. | |
| 9,745,869 B2* | 8/2017 | Ernst | F01K 23/065 |
| 10,094,246 B2* | 10/2018 | Zhou | F01K 15/02 |
| 2005/0098307 A1 | 5/2005 | Goto | |
| 2006/0144585 A1 | 7/2006 | Ha et al. | |
| 2007/0202022 A1 | 8/2007 | Shin et al. | |
| 2008/0011456 A1 | 1/2008 | Meshenky | |
| 2010/0078148 A1* | 4/2010 | Jouanny | F01P 7/165 |
| | | | 165/51 |
| 2013/0105127 A1 | 5/2013 | Postma et al. | |
| 2014/0060504 A1 | 3/2014 | Collins et al. | |
| 2017/0234271 A1* | 8/2017 | Moravec | F02M 26/24 |
| | | | 123/568.12 |
| 2018/0051660 A1* | 2/2018 | Marsh | F02D 41/005 |
| 2018/0313300 A1* | 11/2018 | Zhang | F01P 3/20 |

* cited by examiner

METHOD AND SYSTEMS FOR A MULTISTAGE EXHAUST GAS COOLER

CROSS REFERENCE TO RELATED APPLICATIONS

The present application is a continuation of International Application No. PCT/US2018/026395 entitled "METHOD AND SYSTEMS FOR A MULTISTAGE EXHAUST GAS COOLER," filed on Apr. 6, 2018. International Application No. PCT/US2018/026395 claims priority to U.S. Provisional Patent Application No. 62/482,303 entitled "METHOD AND SYSTEMS FOR A MULTISTAGE EXHAUST GAS COOLER," filed Apr. 6, 2017. The entire contents of the above-listed applications are hereby incorporated by reference for all purposes.

BACKGROUND

Technical Field

Embodiments of the subject matter disclosed herein relate to an exhaust gas cooler for an engine system.

Discussion of Art

Engines may utilize recirculation of exhaust gas from an engine exhaust system to an engine intake system, a process referred to as exhaust gas recirculation (EGR). In some examples, a group of one or more cylinders may have an exhaust manifold that is coupled to an intake passage of the engine such that the group of cylinders is dedicated, at least under some conditions, to generating exhaust gas for EGR. Such cylinders may be referred to as "donor cylinders." In other systems, the exhaust gas may be pulled from a manifold. The manifold may contain exhaust or carry exhaust gases from one or two or multiple or all engine cylinders.

Some EGR systems may include an EGR cooler to reduce a temperature of the recirculated exhaust gas before it enters the intake passage. The EGR cooler may be used to reduce exhaust gas temperature from about 1000 degrees Fahrenheit to about 200 degrees Fahrenheit. As the exhaust gases travel through the EGR cooler, heat is transferred to the heat transfer medium flowing through the cooling tubes of the EGR cooler (e.g., water or other coolant). At an exhaust gas inlet side of the EGR cooler, exhaust gas temperatures are hottest and increased thermal stress may be applied to the EGR cooler, including at the EGR cooling tubes and a tube sheet/EGR cooling tube junction. Additionally, at the hottest portion of the EGR cooler, coolant boiling may occur under some conditions.

BRIEF DESCRIPTION

In one embodiment, a method (e.g., a method for controlling an engine system) comprises controlling a flow of coolant to at least a first stage of a plurality of stages of an exhaust gas cooler relative to a second stage of the plurality of stages to maintain at least one of: a controlled amount of heat removal from the first stage relative to the second stage; an about equal coolant temperature increase across the first stage relative to the second stage; an about equal gas temperature decrease across the first stage relative to the second stage; and/or an about equal gas heat removal across the first stage relative to the second stage.

DETAILED DESCRIPTION

The following description relates to embodiments of an exhaust gas cooler. In one embodiment, a method for the exhaust gas cooler includes controlling a flow of coolant to at least a first stage of a plurality of stages of the exhaust gas cooler relative to a second stage of the plurality of stages to maintain at least one of: a controlled amount of heat removal from the first stage relative to the second stage; an about equal coolant temperature increase across the first stage relative to the second stage; an about equal gas temperature decrease across the first stage relative to the second stage; and an about equal gas heat removal across the first stage relative to the second stage. Each stage of the cooler may include a plurality of cooling tubes separated from cooling tubes of adjacent stages. In one embodiment, the exhaust gas cooler may be a multistage cooler including a plurality of stages arranged in series with one another. In another embodiment, the exhaust gas cooler may be a multistage cooler which includes a first plurality of stages arranged in parallel with one another and a second plurality of stages arranged in series with one another and in series with each of the first plurality of stages.

Figure 1:
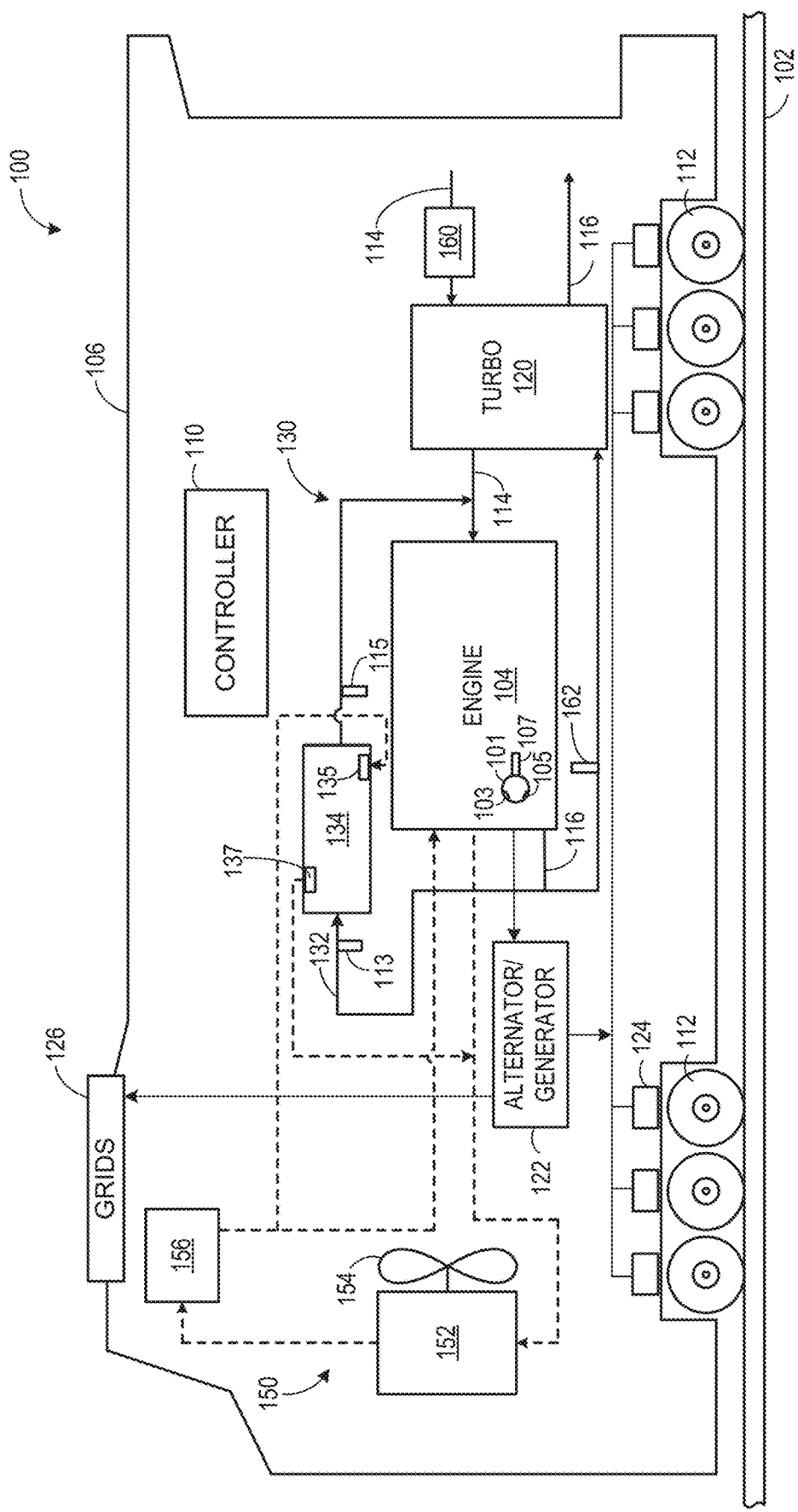
FIG. 1 shows a schematic diagram of a vehicle with an engine and an exhaust gas recirculation (EGR) cooler, according to an embodiment of the invention.
Figure 2:
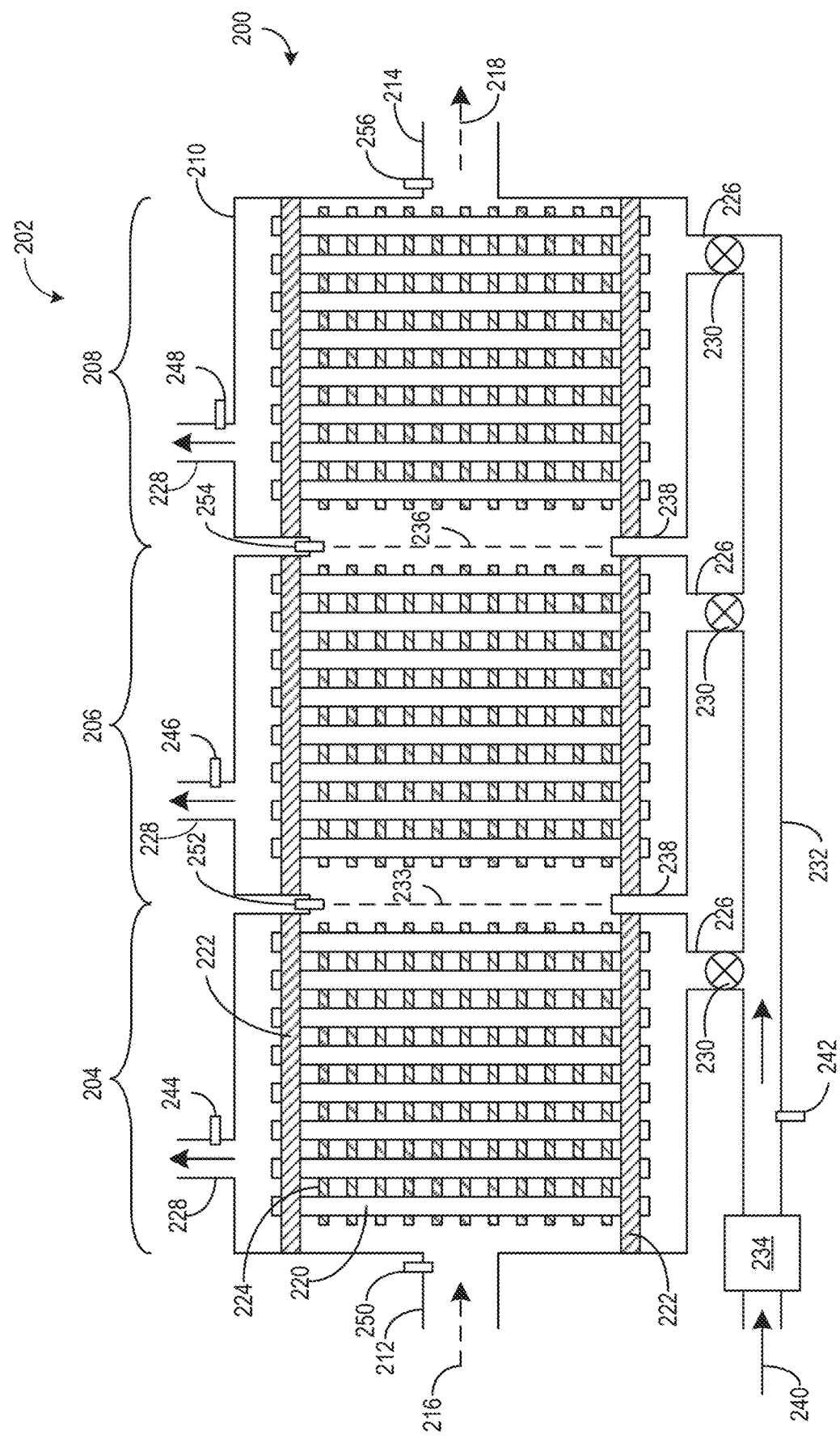
FIG. 2 shows a first embodiment of a multistage exhaust cooler (EGR cooler) having a plurality of serially arranged stages, according to an embodiment of the invention.
Figure 3:
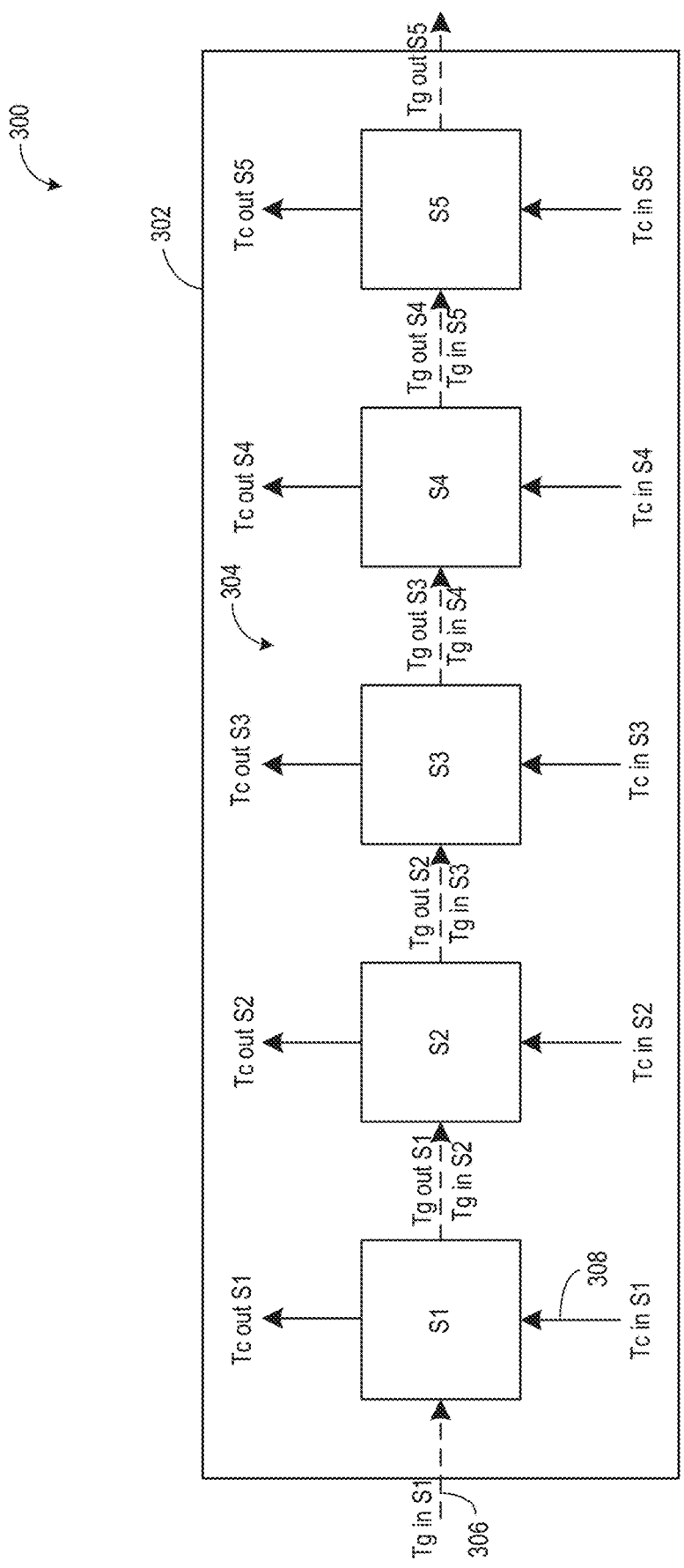
FIG. 3 shows a schematic of a thermal model of a multistage exhaust cooler, according to an embodiment of the invention.
Figure 4:
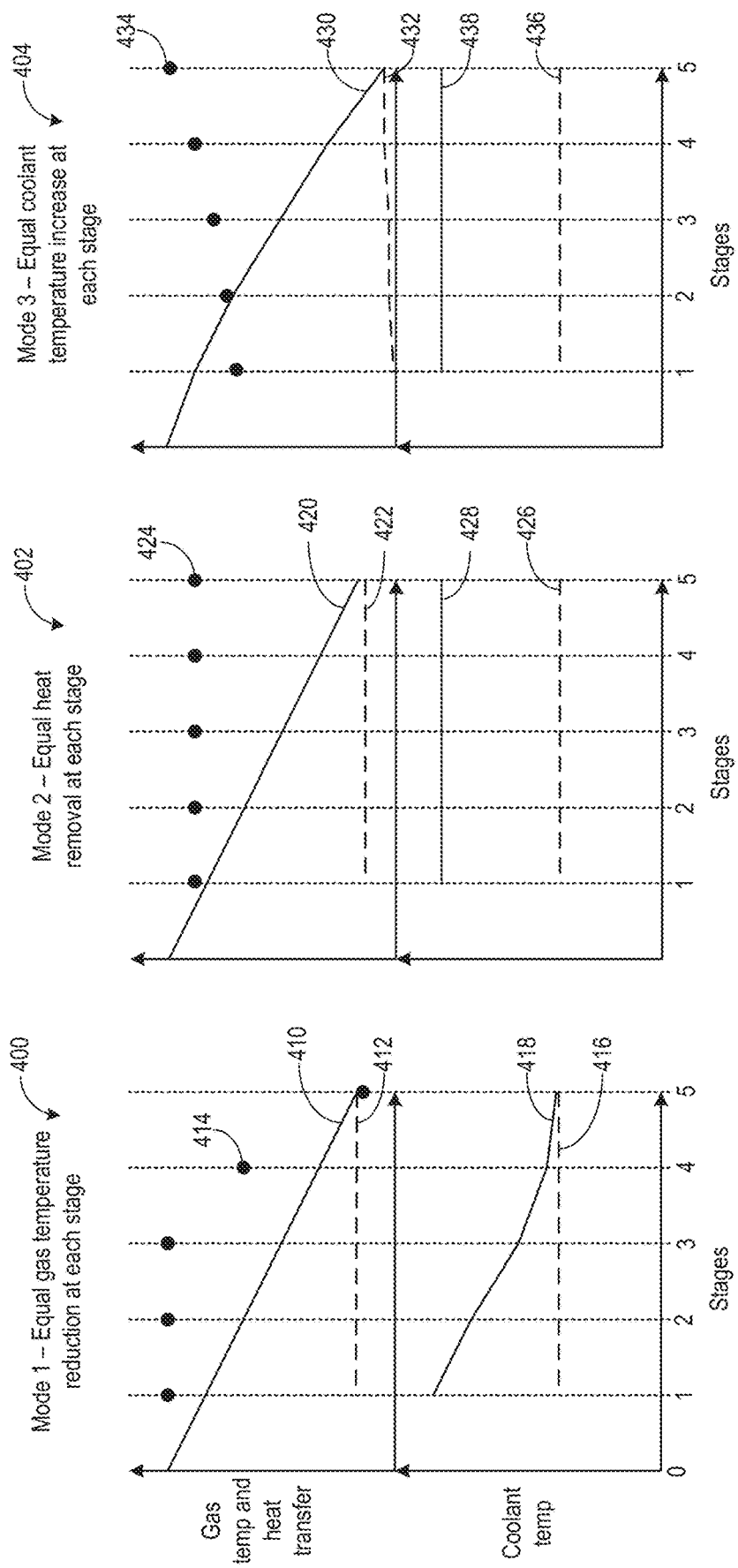
FIG. 4 shows example graphs of heat transfer, exhaust gas temperatures, and coolant temperatures across multiple stages of a multistage exhaust cooler, according to an embodiment of the invention.
Figure 5:
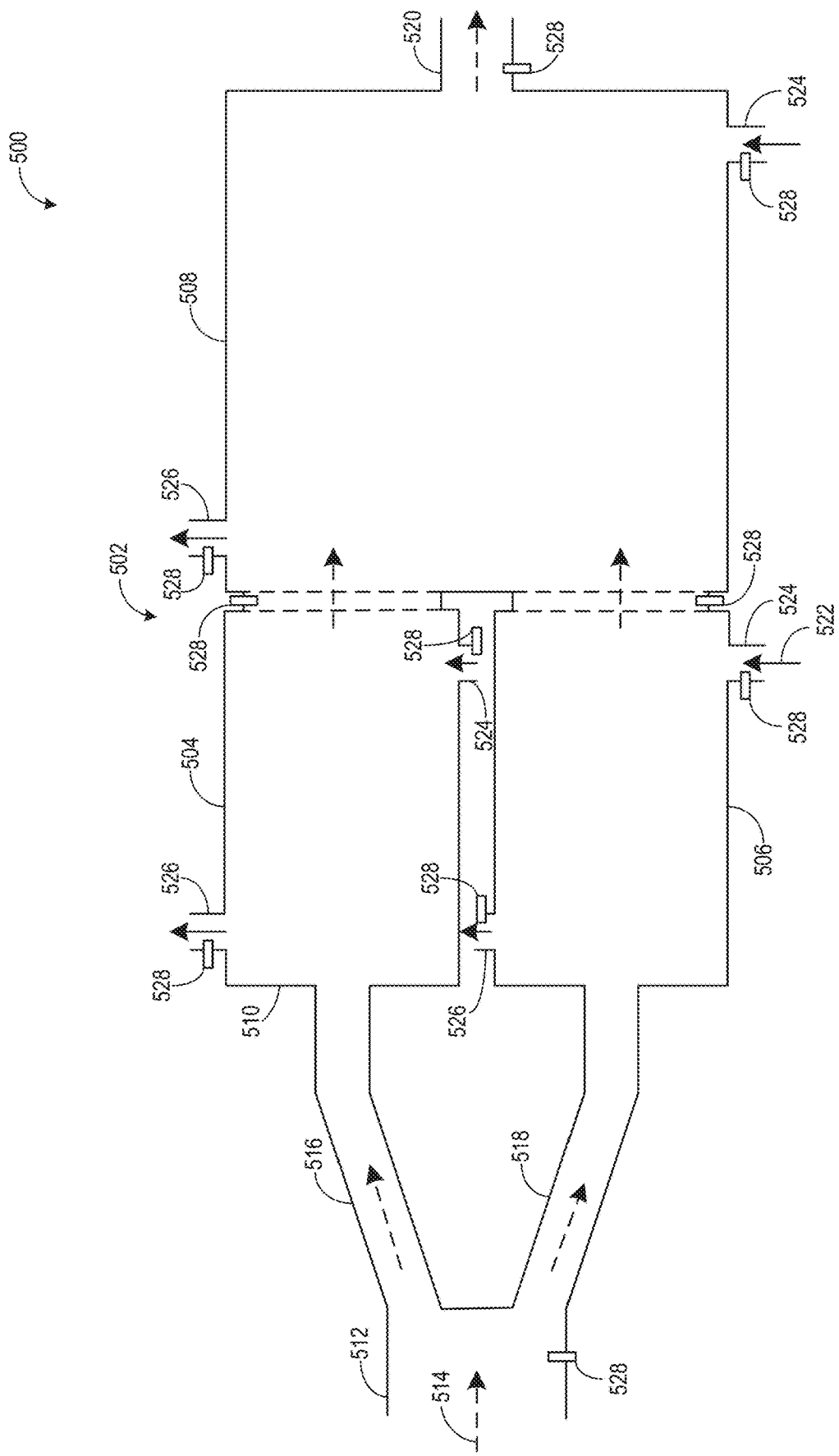
FIG. 5 shows a second embodiment of a multistage exhaust cooler (EGR cooler) having a plurality of parallel stages and plurality of serially arranged stages, arranged downstream of the plurality of parallel stages, according to an embodiment of the invention.
Figure 6:
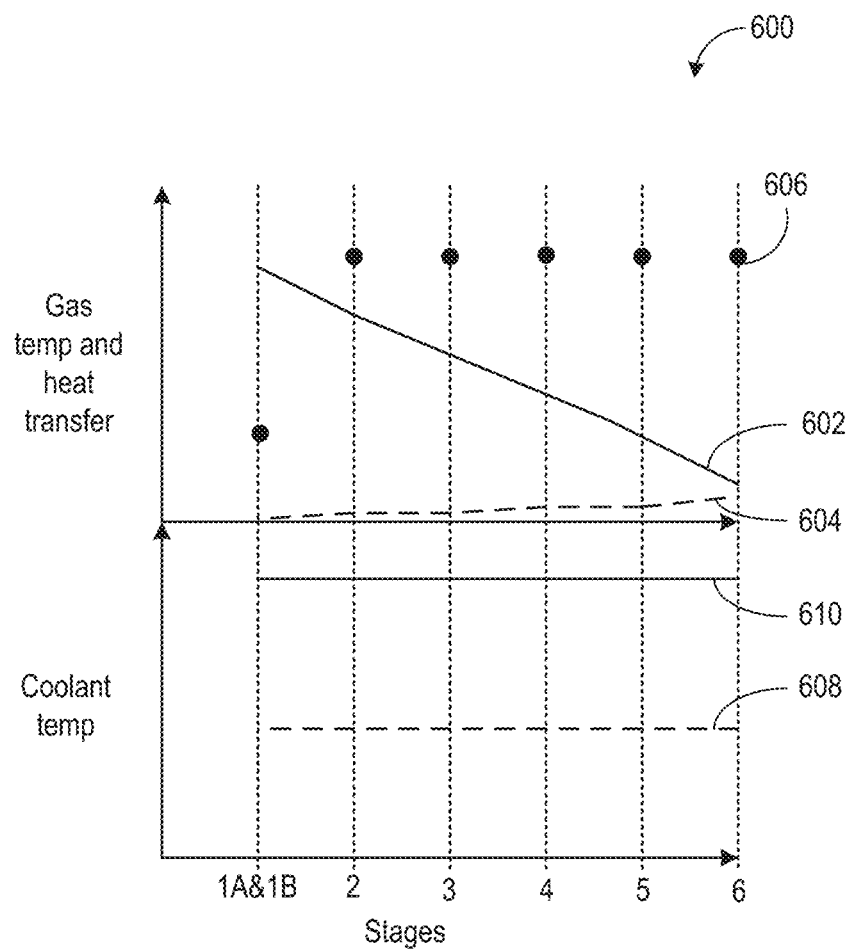
FIG. 6 shows a graph of example exhaust gas temperatures, coolant temperatures, and heat transfer values for various stages of an exhaust cooler having at least two parallel stages and a plurality of serially arranged stages, arranged downstream of the at least two parallel stages, according to an embodiment of the invention.
Figure 7:
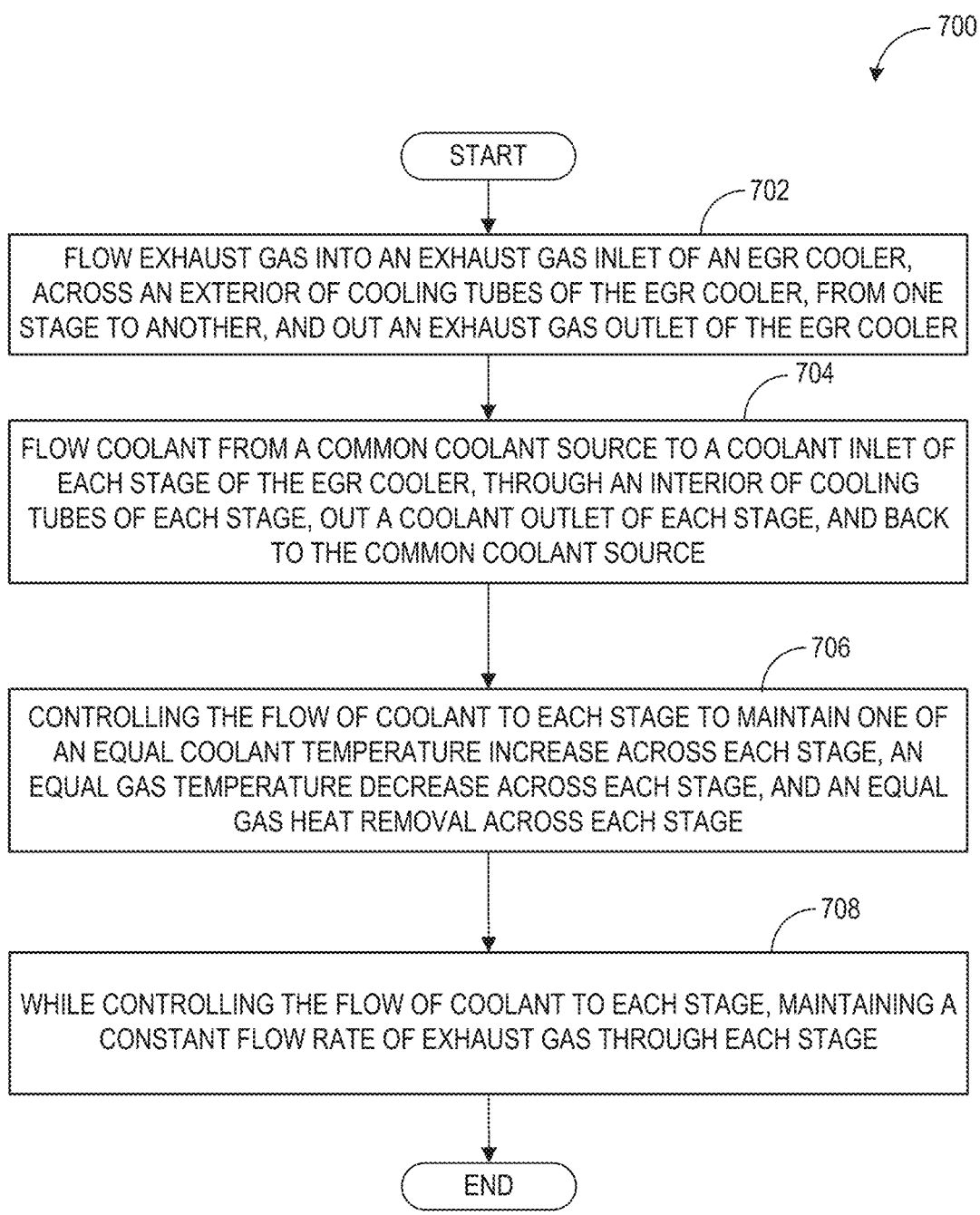
FIG. 7 shows a flow chart of a method for operating a multistage exhaust cooler to maintain controlled heat transfer, exhaust gas temperature drop, and/or coolant temperature increase across each stage of the multistage exhaust cooler, according to an embodiment of the invention.

FIG. 1 shows an example system in which an exhaust gas cooler may be installed. As an example, hot exhaust gases from an engine may travel to an inlet of the exhaust gas cooler and flow through the cooler in order to cool the exhaust gas before returning to an intake passage of the engine. In one embodiment, as shown at FIG. 2, the cooler may include a plurality of stages arranged in series, with each stage including a plurality of cooling tubes arranged in parallel. A thermal model for this type of cooler including serially arranged stages is shown in FIG. 3. In another embodiment, as shown at FIG. 5, the cooler may include a plurality of stages arranged in parallel and a plurality of stages arranged in series. The coolers may be controlled to maintain a relatively constant heat transfer amount, exhaust gas temperature drop, and/or coolant temperature increase across each serially arranged stage of the cooler, as shown by the method shown in FIG. 7. As one example, coolant flow to each stage may be controlled to achieve the relatively constant heat transfer and temperature changes across the stages of the cooler. Graphs showing example temperatures and heat transfer through the multistage coolers during the method described in FIG. 7 are shown at FIGS. 4 and 6.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a mobile platform supporting a system incorporating an embodiment of the invention.

The embodiments disclosed herein are applicable to reciprocating and rotary engines operable using fuels such as gasoline, diesel, jet fuel, kerosene, bio-fuels, gaseous fuels, and various other fuels capable of providing the energy necessary to operate the engine.

FIG. 1 shows an embodiment of a system in which an EGR cooler may be installed. Specifically, FIG. 1 shows a block diagram of an embodiment of a vehicle system 100, herein depicted as a rail vehicle 106 (e.g., locomotive), configured to run on a rail 102 via a plurality of wheels 112. As depicted, the rail vehicle includes an engine 104. The engine includes a plurality of cylinders 101 (only one representative cylinder shown in FIG. 1) that each include at least one intake valve 103, exhaust valve 105, and fuel injector 107. Each intake valve, exhaust valve, and fuel injector may include an actuator that is actuatable via a signal from a controller 110 of the engine. In other non-limiting embodiments, the engine may be a stationary engine, such as in a power-plant application, or an engine in a marine vessel or other off-highway vehicle propulsion system as noted above. Further, in some embodiments, the plurality of cylinder may include a first group of donor cylinders and a second group of non-donor cylinders, where the donor cylinders supply exhaust to an exhaust gas recirculation (EGR) passage routing exhaust back to the intake of the engine, as explained further below.

The engine receives intake air for combustion from an intake passage 114. The intake passage receives ambient air from an air filter 160 that filters air from outside of the rail vehicle. Exhaust gas resulting from combustion in the engine is supplied to an exhaust passage 116. Exhaust gas flows through the exhaust passage, and out of an exhaust stack of the rail vehicle. In one example, the engine is a diesel engine that combusts air and diesel fuel through compression ignition. In another example, the engine is a dual or multi-fuel engine that may combust a mixture of gaseous fuel and air upon injection of diesel fuel during compression of the air-gaseous fuel mix. In other non-limiting embodiments, the engine may additionally combust fuel including gasoline, kerosene, natural gas and/or other fuel gases, biodiesel, or other petroleum distillates of similar density through compression ignition (and/or spark ignition).

In one embodiment, the rail vehicle is a diesel-electric vehicle. As depicted in FIG. 1, the engine is coupled to an electric power generation system, which includes an alternator/generator 122 and electric traction motors 124. For example, the engine is a diesel and/or natural gas engine that generates a torque output that is transmitted to the alternator/generator which is mechanically coupled to the engine. In one embodiment herein, the engine is a multi-fuel engine operating with diesel fuel and natural gas, but in other examples the engine may use various combinations of fuels (liquid and/or gaseous) other than diesel and natural gas.

The alternator/generator produces electrical power that may be stored and applied for subsequent propagation to a variety of downstream electrical components. As an example, the alternator/generator may be electrically coupled to a plurality of traction motors and the alternator/generator may provide electrical power to the plurality of traction motors. As depicted, the plurality of traction motors are each connected to one of the plurality of wheels to provide tractive power to propel the rail vehicle. One example configuration includes one traction motor per wheel set. As depicted herein, six traction motors correspond to each of six pairs of motive wheels of the rail vehicle. In another example, alternator/generator may be coupled to one or more resistive grids 126. The resistive grids may be configured to dissipate excess engine torque via heat produced by the grids from electricity generated by alternator/generator.

In some embodiments, the vehicle system may include a turbocharger 120 that is arranged between the intake passage and the exhaust passage. The turbocharger increases the density of the ambient air drawn into the intake passage in order to provide greater charge air density for combustion to increase power output and/or operating efficiency of the engine. The turbocharger may include a compressor (not shown) which is at least partially driven by a turbine (not shown). While in this case a single turbocharger is included, the system may include multiple turbine and/or compressor stages. Additionally or alternatively, in some embodiments, a supercharger may be present to compress the intake air via a compressor driven by a motor or the engine, for example. Further, in some embodiments, a charge air cooler (e.g., water-based intercooler) may be present between the compressor of the turbocharger or supercharger and intake manifold of the engine. The charge air cooler may cool the compressed air to further increase the density of the charge air.

In some embodiments, the vehicle system may further include an aftertreatment system coupled in the exhaust passage upstream and/or downstream of the turbocharger. In one embodiment, the aftertreatment system may include a diesel oxidation catalyst (DOC) and a diesel particulate filter (DPF). In other embodiments, the aftertreatment system may additionally or alternatively include one or more emission control devices. Such emission control devices may include a selective catalytic reduction (SCR) catalyst, three-way catalyst, $NO_x$ trap, or various other devices or exhaust aftertreatment systems.

The vehicle system may further include an exhaust gas recirculation (EGR) system 130 coupled to the engine, which routes exhaust gas from the exhaust passage of the engine to the intake passage downstream of the turbocharger (e.g., compressor of the turbocharger unit). In some embodiments, the exhaust gas recirculation system may be coupled exclusively to a group of one or more donor cylinders of the engine (also referred to as a donor cylinder system). As depicted in FIG. 1, the EGR system includes an EGR passage 132 and an EGR cooler (e.g., exhaust gas cooler) 134 to reduce the temperature of the exhaust gas before it enters the intake passage. By introducing exhaust gas to the engine, the amount of available oxygen for combustion is decreased, thereby reducing the combustion flame temperatures and reducing the formation of nitrogen oxides (e.g., NOR). Additionally, the EGR system may include one or more sensors for measuring temperature and pressure of the exhaust gas flowing into and out of the EGR cooler. For example, there may be a temperature and/or pressure sensor 113 positioned upstream of the EGR cooler (e.g., at the exhaust inlet of the EGR cooler) and a temperature and/or pressure sensor 115 positioned downstream of the EGR cooler (e.g., at the exhaust outlet of the EGR cooler). In this way, the controller may measure a temperature and pressure at both the exhaust inlet and outlet of the EGR cooler.

In some embodiments, the EGR system may further include an EGR valve for controlling an amount of exhaust gas that is recirculated from the exhaust passage of the engine to the intake passage of the engine. The EGR valve may be an on/off valve controlled by a controller 110, or it may control a variable amount of EGR, for example. As shown in the non-limiting example embodiment of FIG. 1, the EGR system is a high-pressure EGR system. In other embodiments, the vehicle system may additionally or alternatively include a low-pressure EGR system, routing EGR from downstream of the turbine to upstream of the compressor (e.g., compressor of the turbocharger unit).

As depicted in FIG. 1, the vehicle system further includes a cooling system 150 (e.g., engine cooling system). The cooling system circulates coolant through the engine to absorb waste engine heat and distribute the heated coolant to a heat exchanger, such as a radiator 152 (e.g., radiator heat exchanger). In one example, the coolant may be water. A fan 154 may be coupled to the radiator in order to maintain an airflow through the radiator when the vehicle is moving slowly or stopped while the engine is running. In some examples, fan speed may be controlled by the controller. Coolant which is cooled by the radiator may enter a tank (not shown). The coolant may then be pumped by a water, or coolant, pump 156 back to the engine or to another component of the vehicle system, such as the EGR cooler and/or charge air cooler.

As shown in FIG. 1, a coolant/water passage from the pump splits in order to pump coolant (e.g., water) to both the EGR cooler and engine in parallel. In one example, as shown in FIG. 1, the pump may pump coolant (or cooling water) into a coolant inlet 135. Coolant flows through a plurality of cooling tubes (as shown in FIG. 2, described in greater detail below) within the EGR cooler. Coolant may then exit the EGR cooler via a coolant exit 137. Further, there may be one or more additional sensors coupled to the coolant inlet and coolant exit of the EGR cooler for measuring a temperature of the coolant entering and exiting the EGR cooler, as shown in FIG. 2. As described further below with reference to FIGS. 2-7, the EGR cooler may include a plurality of stages where each stage includes a set of (e.g., multiple) cooling tubes. Each stage may be separated by a manifold or some other structural element. However, exhaust gas may flow from one stage to the next, in series. Coolant flow may separate at the coolant inlet of the EGR cooler to flow separately (and in parallel) through the different stages of the EGR cooler. Coolant flow exiting each stage may then recombine and return to the cooling system shown in FIG. 1.

The rail vehicle further includes the controller (e.g., engine controller) to control various components related to the rail vehicle. As an example, various components of the vehicle system may be coupled to the controller via a communication channel or data bus. In one example, the controller includes a computer control system. The controller may additionally or alternatively include a memory holding non-transitory computer readable storage media (not shown) including code for enabling on-board monitoring and control of rail vehicle operation. In some examples, the controller may include more than one controller each in communication with one another, such as a first controller to control the engine and a second controller to control other operating parameters of the locomotive (such as tractive motor load, blower speed, etc.). The first controller may be configured to control various actuators based on output received from the second controller and/or the second controller may be configured to control various actuators based on output received from the first controller.

The controller may receive information from a plurality of sensors and may send control signals to a plurality of actuators. The controller, while overseeing control and management of the engine and/or rail vehicle, may be configured to receive signals from a variety of engine sensors, as further elaborated herein, in order to determine operating parameters and operating conditions, and correspondingly adjust various engine actuators to control operation of the engine and/or rail vehicle. For example, the engine controller may receive signals from various engine sensors including, but not limited to, engine speed, engine load, intake manifold air pressure, boost pressure, exhaust pressure, ambient pressure, ambient temperature, exhaust temperature, particulate filter temperature, particulate filter back pressure, engine coolant pressure, gas temperatures in the EGR cooler, coolant temperature in the EGR cooler, or the like. The controller may also receive a signal of an amount of oxygen in the exhaust from an exhaust oxygen sensor 162. Additional sensors, such as coolant temperature sensors, may be positioned in the cooling system and/or within the EGR cooler. Correspondingly, the controller may control the engine and/or the rail vehicle by sending commands to various components such as the traction motors, the alternator/generator, fuel injectors, valves (e.g., coolant and/or EGR cooler valve), coolant pump, or the like. For example, the controller may control the operation of a restrictive element (e.g., such as a valve) in the engine cooling system. Other actuators may be coupled to various locations in the rail vehicle.

FIG. 2 shows a first embodiment of an exhaust cooler (e.g., EGR cooler) 200 (which may be EGR cooler 134 shown in FIG. 1) that includes multiple stages (e.g., cooling stages) 202. Specifically, FIG. 2 shows a first stage 204, a second stage 206, and a third stage 208. While FIG. 2 shows the EGR cooler having three stages, in alternate embodiments, the EGR cooler may have more or less than three stages (e.g., such as two, four, five, or six stages). For example, the EGR cooler may have 3-5 stages.

All the stages of the EGR cooler are arranged in series with one another, within a housing 210 of the EGR cooler, between an exhaust gas inlet 212 and exhaust gas outlet 214 of the housing. The exhaust gas inlet may be coupled to an exhaust passage of an engine (such as exhaust passage 116 shown in FIG. 1) and the exhaust gas outlet may be coupled to an intake passage of the engine (such as intake passage 114 shown in FIG. 1). As such, hot exhaust gas 216 may enter the EGR cooler at the exhaust gas inlet and cooled exhaust gas 218 may exit the EGR cooler at the exhaust gas outlet. It should be noted that the dashed arrows in FIG. 2 indicate exhaust gas flow and the solid arrows indicated coolant flow through the EGR cooler.

Each stage of the EGR cooler includes a plurality of cooling tubes 220 coupled to and between tube sheets 222 which are directly coupled to the housing of the EGR cooler. Specifically, an inlet end of each of the plurality of cooling tubes are coupled to a first tube sheet and an outlet end of each of the plurality of cooling tubes are coupled to a second tube sheet. The cooling tubes of each stage may be arranged within a single bundle or multiple bundles of cooling tubes that are separated from cooling tubes of adjacent stages. A plurality of fins 224 may be coupled to an exterior surface of the cooling tubes in each stage. A density of the fins (e.g., number of fins per unit area of the EGR cooler) may be different between the stages. Further, the number of cooling tubes within each stage may be the same or different, and selected based on desired heat transfer at each stage. As one example, the number of varying tubes between the stages may depend on several parameters which may include but are not limited to: heat transfer, coolant pressure drop, coolant temperature and gas temperature. The number of tubes in each stage may be determined to be different for the different modes or configurations of the EGR cooler (as described further below with reference to FIGS. 2-7. In one example, the more upstream stages, such as stage 1 and stage 2, will have higher tube density (number of tubes/length of tubesheet) than the more downstream stages.

Each stage includes a coolant inlet 226 and coolant outlet 228. The cooling tubes of each stage are coupled between the coolant inlet and the coolant outlet for that stage. In some examples, the coolant inlet may include a coolant inlet manifold and the coolant outlet may include a coolant outlet manifold, each of these manifolds in fluidic communication with open ends of the cooling tubes. As a result, coolant may flow from a coolant inlet of each stage, through an inside of the cooling tubes of each stage, and out the coolant outlet of each stage.

Each coolant inlet of each stage includes a flow control element 230 disposed therein. As one example, the flow control elements may be valves, where each valve includes an actuator that is actuatable via an electronic signal sent by a controller (e.g., controller 110 shown in FIG. 1). In one example, the valves may be two-position valves that are adjustable between an open positon that allows coolant flow into the stage it is coupled to and a closed position that blocks coolant flow into the stage it is coupled to. In this example, the controller may individually modulate (at a certain rate or for a certain duration of opening) the position and/or the timing and the duration of opening of the valves between open and closed positions to control an amount of coolant flowing into the stage and through the cooling tubes of the stage. In another example, the valves may be continuously adjustable valves where the controller may adjust an amount of opening (e.g., a size of an opening of the valve) of the valve to control the amount of coolant flowing into the stage and through the cooling tubes of the stage. As discussed further below, each of the flow control elements may be individually actuated and adjusted via signals sent by the controller. In this way, the flow control elements may be adjusted into different positions and/or modulated at different rates relative to one another.

In an alternate embodiment, one or more of the flow control elements may be orifices that passively control water/coolant flow through the cooling tubes rather than controller-actuated valves. In this embodiment, each flow control element 230 of each stage may have a pre-defined orifice size which may be the same or different than other flow control elements of other stages. The size of the orifice of each flow control element may be selected according to a desired flow rate through the flow control element.

Each coolant inlet of each stage is coupled to a common coolant passage 232. The common coolant passage may include or be coupled to a coolant pump 234 (which may be similar to pump 156 in FIG. 1). In this way, the common coolant passage may be referred to herein as a common coolant source for each of the stages of the EGR cooler. Additionally, the controller may adjust or modulate an actuator of the coolant pump, in order to adjust the coolant flow rate to the coolant inlets of the different stages to a desired level. The desired level for the coolant flow rate may be chosen based on a best heat transfer coefficient for heat transfer between the coolant (e.g., water) and exhaust gas at the cooling tubes. In another embodiment, the coolant pump operates or is driven independently by a variable speed electric motor. This may enable or ensure independent control of pump speed and, hence continuously variable coolant flow.

As introduced above, exhaust gas flow (shown by dashed arrows 216 and 218) enters the EGR cooler at the exhaust gas inlet, flows over an exterior (e.g., outside surface) of the cooling tubes (and between the fins) of the first stage 204, exits the first stage and enters the second stage at a first stage interface 233, flows over the exterior of the cooling tubes of the second stage 206, exits the second stage and enters the third stage at a second stage interface 236, flows over the exterior of cooling tubes of the third stage 208, and exits the EGR cooler via the exhaust gas inlet. In this way, exhaust gas flows in series through the multiple stages of the EGR cooler. In one example, the stages of the EGR cooler are separated via manifolds (or interior sidewalls of the EGR cooler housing) 238.

While exhaust gas is flowing through the EGR cooler, as described above, coolant flow 240, denoted by solid arrows, is pumped via pump 234, through the common coolant passage 232 and to the coolant inlets 226 of each stage. Coolant then enters each individual stage via each respective coolant inlet. In this way, coolant enters and flows through each stage in parallel. Coolant enters the cooling tubes and flows through an interior of the cooling tubes of each stage and then exits each stage via the respective coolant outlet. The coolant flow from each stage may then rejoin downstream of all the coolant outlets and flow back to the cooling system of the engine system.

As shown in FIG. 2, the EGR cooler and coolant system may include a plurality of temperature sensors adapted to measure a temperature of the coolant and exhaust gas at various points within the EGR cooler system. As such, each of these temperature sensors may be in electronic communication with a controller, such as controller 110 shown in FIG. 1. As described further below, the controller may adjust a position of the flow control elements 230 based on feedback from these temperature sensors and pre-defined controls tables (such as look-up tables) programmed into the controller 110, as one example. As shown in FIG. 2, a first coolant temperature sensor 242 is positioned within the common coolant passage and adapted to measure a coolant inlet temperature for each stage (e.g., a temperature of coolant entering inlet ends of the cooling tubes of each stage). A second coolant temperature sensor 244 is positioned at the coolant outlet of the first stage, a third coolant temperature sensor 246 is positioned at the coolant outlet of the second stage, and a fourth coolant temperature sensor 248 is positioned at the coolant outlet of the third stage. Thus, the second, third and fourth coolant temperature sensors are adapted to measure the temperature of coolant exiting outlet ends of the cooling tubes of each of the first, second, and third stages, respectively. A first exhaust gas temperature sensor 250 (which may include an additional or separate exhaust gas flow rate sensor in a similar location) is positioned at the exhaust gas inlet of the EGR cooler and adapted to measure a temperature of exhaust gas entering the first stage of the EGR cooler. A second exhaust gas temperature sensor 252 is positioned at the interface between the first and second stages and is adapted to measure a temperature of the exhaust gas exiting the first stage and entering the second stage. A third exhaust gas temperature sensor 254 is positioned at the interface between the second and third stages and is adapted to measure a temperature of the exhaust gas exiting the second stage and entering the third stage. A fourth exhaust gas temperature sensor 256 is positioned at the exhaust gas outlet of the EGR cooler and is adapted to measure a temperature of exhaust gas exiting the third stage and the EGR cooler.

As explained further below with reference to method 700 shown in FIG. 7, the controller may control coolant flow to each of the stages of the EGR cooler. For example, the controller may control the flow of coolant to at least a first stage of a plurality of stages of the EGR cooler (such as first stage 204 shown in FIG. 2) relative to a second stage of the plurality of stages. For example the flow of coolant to at least the first stage may be controlled to maintain at least one of a controlled amount of heat removal from the first stage relative to the second stage, an about equal coolant temperature increase across the first stage relative to the second stage, an about equal gas temperature decrease across the first stage relative to the second stage, and an about equal gas heat removal across the first stage relative to the second stage. As one example, this may be accomplished by individually controlling the flow of coolant to each stage of the plurality of stages of the EGR cooler (e.g., via individually adjusting flow control elements, such as elements 230 shown in FIG. 2). As another example, this may be accomplished by controlling the flow of coolant to at least the first stage (e.g., via adjusting a position or opening duration of a flow control element such as in a coolant flow control valve) while maintaining a relatively constant flow rate of coolant to the remaining stages. For example, the flow of coolant to the first stage may be reduced or increased relative to the second stage in order to maintain relatively equal heat removal, coolant temperature increase, or gas temperature drop across the first stage and second stage of the EGR cooler.

In yet another example, the relatively equal heat removal, gas temperature drop, or coolant temperature increase across the first stage and second stage of the EGR cooler (or across all stages of the EGR cooler) may be maintained by having a different number of tubes and/or fins within each stage of the EGR cooler. For example, the first stage of the EGR cooler (e.g., first stage 204 shown in FIG. 2) may have a reduced number of cooling tubes relative to the second stage of the EGR cooler (e.g., second stage 206 shown in FIG. 2). In another example, the first stage of the EGR cooler may have a reduced fin density relative to the second stage (or remaining stages) of the EGR cooler.

By maintaining a relatively equal (e.g., about equal within a set tolerance range or percentage, such as within 1% of an average between all the stages) amount of gas temperature reduction, heat removal (from the gas to the coolant), and/or coolant temperature increase, less thermal stress may be applied to the cooling tubes and/or other structural elements of the first stage (e.g., most upstream stage) of the EGR cooler. Specifically, without controlling the gas temperature reduction, heat removal, or coolant temperature increase in this way, the first section of the EGR cooler may experience the highest thermal load and largest amount of heat removal. As a result, the cooling tubes (and/or the cooling tube-tube sheet interface) within this first stage may experience degradation. By equalizing, or spreading out, the amount of heat transfer between the stages of the EGR cooler, the overall thermal stress of the cooling tubes of the most upstream stage of the EGR cooler is reduced.

FIG. 3 shows a schematic 300 of a thermal model of a multistage EGR cooler 302 (which may represent an EGR cooler similar to EGR cooler 200 shown in FIG. 2). Specifically, FIG. 3 shows gas and coolant temperatures at multiple stages of the EGR cooler. FIG. 3 shows five stages 304 (which may have similar composition to the stages 202 described above with reference to FIG. 2) arranged in series with one another within the EGR cooler. However, an alternate number of stages is possible, such as three, four, or six. The five stages are labeled as S1, S2, S3, S4, and S5 in FIG. 3. Exhaust flow 306 through the stages is illustrated by dashed arrows and coolant flow 308 through the stages is illustrated by solid arrows within FIG. 3.

For each stage, the temperature of coolant entering and exiting each stage and the temperature of exhaust gas entering and exiting each stage is labeled. For example, for stage 1, S1, Tg in S1 denotes the temperature of exhaust gas entering S1, Tg out S1 denotes the temperature of exhaust gas exiting S1, Tc in S1 denotes the temperature of coolant (e.g., water) entering S1, and Tc out S1 denotes the temperature of coolant exiting S1. For all stages, the temperature of coolant entering each stage may be the same (since coolant is supplied to each stage from a common coolant source, as described above with reference to FIG. 2). Thus Tc in S1=Tc in S2=Tc in S3=Tc in S5=Tc in S6. Additionally, the temperature of exhaust gas exiting one stage is equal to (or about equal to) the temperature of exhaust gas entering the next, immediately downstream, stage. As an example, Tg out S1=Tg in S2. The exhaust gas and coolant temperatures may be measured by temperature sensors positioned at those approximate locations within the EGR cooler (such as the temperature sensors shown in FIG. 2, as discussed above). Further, the exhaust gas temperature drop (e.g., decrease or ΔTg) across each stage may be determined by subtracting the outlet gas temperature (e.g., Tg out S1) from the inlet gas temperature (e.g., Tg in S1) and the coolant temperature increase (e.g., change or ΔTc) across each stage may be determined by subtracting the inlet coolant temperature (e.g., Tc in S1) from the outlet coolant temperature (e.g., Tc out S1). The amount of heat transferred between the exhaust gas and coolant, or the amount of heat removed from the exhaust gas via the coolant, may be denoted as Q and have units of Btu/hour, in one example.

Plots of example coolant temperatures (inlet and outlet), gas temperatures, change in gas temperatures (inlet–outlet), and heat transfer across the five stages of the example EGR cooler depicted in FIG. 3 are shown in FIG. 4. Specifically, FIG. 4 shows a first graph 400 for a first mode (Mode 1) of controlling the EGR cooler (e.g., controlling coolant flow to the stages of the EGR cooler) to maintain a relatively equal reduction in exhaust gas temperature at each stage, a second graph 402 for a second mode (Mode 2) of controlling the EGR cooler (e.g., controlling coolant flow to the stages of the EGR cooler) to maintain relatively equal heat removal (heat transfer, or heat removed from the exhaust gas) at each stage, and a third graph 404 for a third mode (Mode 3) of controlling the EGR cooler (e.g., controlling coolant flow to the stages of the EGR cooler) to maintain a relatively equal increase in coolant temperature at each stage. Each graph includes a top plot showing exhaust gas temperatures and heat transfer values for each stage (and/or between stages) of the EGR cooler (five stages are shown which correlate to the example EGR cooler 300 shown in FIG. 3) and a bottom plot showing coolant temperatures (inlet and outlet) at each stage of the EGR cooler.

Starting with graph 400, during the first mode, exhaust gas temperatures through the five stages (from the exhaust gas inlet of the EGR cooler, illustrated by stage 0, to the exit of stage 5 which may also be the exhaust gas outlet of the EGR cooler, illustrated by stage 5) are shown at plot 410, exhaust gas temperature drop across each stage (Tg in−Tg out) is shown at plot 412, an amount of heat transfer (e.g., heat transferred from the exhaust gas to the coolant) at each stage is shown at plot 414, a temperature of coolant entering each stage (coolant inlet temperature) is shown at plot 416, and a temperature of coolant exiting each stage (coolant outlet temperature) is shown at plot 418. During the first mode, the coolant flow through each stage of the EGR cooler is controlled so that the exhaust gas temperature drop across each stage (plot 412) is the same for each stage. Thus, the exhaust gas temperatures (plot 410) decrease at a steady rate (constant slope) from one stage to the next. Heat transfer at each stage is relatively constant for the first three stages and then decreases for stages four and five (plot 412). Additionally, while the coolant inlet temperature remains the same entering each stage (plot 416), coolant outlet temperature decreases at each stage (plot 418).

Turning to graph 402, during the second mode, exhaust gas temperatures through the five stages (from the exhaust gas inlet of the EGR cooler, illustrated by stage 0, to the exit of stage 5 which may also be the exhaust gas outlet of the EGR cooler, illustrated by stage 5) are shown at plot 420, exhaust gas temperature drop across each stage (Tg in−Tg out) is shown at plot 422, an amount of heat transfer (e.g., heat transferred from the exhaust gas to the coolant) at each stage is shown at plot 424, a temperature of coolant entering each stage (coolant inlet temperature) is shown at plot 426, and a temperature of coolant exiting each stage (coolant outlet temperature) is shown at plot 428. During the second mode, the coolant flow through each stage of the EGR cooler is controlled (e.g., individually adjusted or controlled) so that the heat transfer (e.g., heat removal from the exhaust gas at each stage) is the same for each stage (plot 424). As a result of maintaining relatively constant exhaust gas heat transfer at each stage, the exhaust gas temperatures (plot 420) decrease at a relatively steady rate from one stage to the next and the exhaust gas temperature drop across each stage also remains relatively constant (plot 422). Additionally, both the coolant inlet temperature (plot 426) and the coolant outlet temperature (plot 428) remain relatively constant at each stage.

Turning to graph 404, during the third mode, exhaust gas temperatures through the five stages (from the exhaust gas inlet of the EGR cooler, illustrated by stage 0, to the exit of stage 5 which may also be the exhaust gas outlet of the EGR cooler, illustrated by stage 5) are shown at plot 430, exhaust gas temperature drop across each stage (Tg in−Tg out) is shown at plot 432, an amount of heat transfer (e.g., heat transferred from the exhaust gas to the coolant) at each stage is shown at plot 434, a temperature of coolant entering each stage (coolant inlet temperature) is shown at plot 436, and a temperature of coolant exiting each stage (coolant outlet temperature) is shown at plot 438. During the third mode, the coolant flow through each stage of the EGR cooler is controlled so that the coolant temperature increase (e.g., difference in temperature between the coolant inlet and coolant outlet) at each stage is maintained relatively constant (e.g., equal) (plots 436 and 438). By maintaining the relatively constant coolant temperature increase at each stage, the heat transfer at each stage increases (by a greater amount at the later stages, as seen at plot 434), exhaust gas temperatures decrease at each stage (plot 430), and the exhaust gas temperature drop across each stage increases slightly from the first to last stage (plot 432).

FIG. 5 shows a second embodiment of an exhaust cooler (e.g., EGR cooler) 500 (which may be EGR cooler 134 shown in FIG. 1) that includes multiple stages (e.g., cooling stages) 502. Specifically, FIG. 5 shows a first stage 504, a second stage 506, and a third stage 508. The stages shown in FIG. 5 may have a similar composition to the stages shown in FIG. 2, as described above. For example, each of the stages shown in FIG. 5 may include a plurality of cooling tubes and, in some examples, a plurality of fins coupled to the plurality of cooling tubes (as shown in FIG. 2). As also shown in FIG. 2, the cooling tubes of one stage may be separated from cooling tubes of another, or adjacent, stage via a manifold or wall of a housing 510 of the EGR cooler. As shown in FIG. 5, the first stage 504 is arranged in parallel with the second stage 506. The first stage 504 and the second stage 506 may be referred to as split flow stages. Herein, the term "split flow" refers to equal, or relatively equal, flow rate of exhaust gas flowing through each of the split flow stages. Specifically, the EGR cooler shown in FIG. 5 includes an exhaust gas inlet 512, where hot exhaust gas 514 enters the EGR cooler. The exhaust gas inlet bifurcates into a first parallel passage 516 that is directly coupled to and directs exhaust gas into the first stage and a second parallel passage 518 that is directly coupled to and directs exhaust gas into the second stage. Thus, exhaust gas flows, in parallel, through the first and second stages and then exits the first and second stages to enter the third stage. Within the third stage, the exhaust gases from the first and second stage recombine and mix together and further heat transfer occurs. While FIG. 5 shows the EGR cooler having two parallel stages, in alternate embodiments, the EGR cooler may have more than two parallel-arranged stages (e.g., such as three or four).

The third stage 508 may include one or more serially arranged stages, such as stages 202 shown in FIG. 2. For example, the third stage may include two to six individual stages (such as stages 204, 206, and 208 shown in FIG. 2). As such, exhaust gas may mix and flow, in series, from one stage to the next adjacent stage within the third stage. As such, the EGR cooler shown in FIG. 5 may include a combination of parallel arranged stages and serially arranged stages, where the serially arranged stages (the third stage) are arranged in series with each of the parallel arranged stages (the first stage and second stage). Exhaust gas flow exits the third stage via an exhaust gas outlet 520. Exhaust gas flow through the EGR cooler is shown by dashed arrows (e.g., arrow 514) and coolant flow through the EGR cooler is shown by solid arrows (e.g., arrow 522).

Each of the stages of the EGR cooler shown in FIG. 5 has its own coolant inlet 524 and coolant outlet 526. All the coolant inlets may be coupled to a common coolant source (and common coolant passage), similar to passage 232 shown in FIG. 2. Additionally, all the coolant outlets may recombine downstream of the EGR cooler and coolant may then return to the common coolant source. The third stage may additionally include multiple coolant inlets and outlets that are dedicated to the individual stages (serially arranged stages) of the third stage (similar to the coolant inlets 226 and coolant outlets 228 shown in FIG. 2). Additionally, the EGR cooler shown in FIG. 5 may have a plurality of temperature sensors 528 that are in communication with a controller (such as controller 110 shown in FIG. 1) and adapted to measure exhaust gas or coolant temperatures at the location in which they are positioned. FIG. 5 shows example positioning of these temperature sensors; however, alternate positions are possible (such as individual sensors within passages S16 and S18 instead of or in addition to the upstream sensor in the exhaust gas inlet). Further, the third stage may include additional temperature sensors for the multiple serially arranged stages of the third stage, such as those shown in FIG. 2.

In an alternate embodiment, instead of two stages arranged in parallel with one another within a single EGR cooler, the EGR system may include two or more exhaust (EGR) coolers. Exhaust gas from the engine may be directed to the separate exhaust coolers, which may be arranged in parallel with one another. Thus, first stage 504 and second stage 506, may be separate exhaust coolers, in the alternate embodiment. One or both of these separate, parallel arranged, exhaust coolers may include multiple stages, such as EGR cooler 200 shown in FIG. 2 or the third stage of EGR cooler 500 shown in FIG. 5. Thus, coolant flow through the multiple stages of the separate EGR coolers may then be controlled to maintain one of a relatively equal coolant temperature increase across each stage, a relatively equal gas temperature decrease across each stage, and a relatively equal gas heat removal across each stage, as described above and further below with reference to FIG. 7.

FIG. 6 shows a graph 600 of example exhaust gas and coolant temperatures and heat transfer for various stages of an exhaust cooler having at least two parallel stages (such as 1A & 1B) and a plurality of serially arranged stages (such as 2, 3, 4, 5, and 6), arranged downstream of the at least two parallel stages, such as the exhaust cooler 500 shown in FIG. 5. Specifically, graph 600 shows exhaust gas temperatures through the multiple stages of the exhaust cooler at plot 602, a decrease in exhaust gas temperature at each stage (e.g., inlet–outlet temperature) at plot 604, heat transfer at each stage at plot 606, coolant inlet temperature for each stage at plot 608, and coolant outlet temperature for each stage at plot 610. In the example shown in FIG. 6, the exhaust cooler has two parallel stages, 1A and 1B (similar to the first stage and second stage shown in FIG. 5) and five serially arranged stages, 2-6 (which may be similar to stages 202 shown in FIG. 2 and positioned within the third stage of FIG. 5). In this way, exhaust gas flows in parallel through stages 1A and 1B and then recombines at stage 2 and then flows consecutively (in series) through the remaining stages (stages 3-6).

As shown at graph 600, heat transfer is lowest in the parallel stages 1A and 1B and then increases and is relatively constant at stages 2-6 (plot 606). The reduced heat transfer at the first, parallel stages, may reduce thermal stress at the inlet side of the exhaust cooler (e.g., reduce thermal stress on the cooling tubes of these parallel, most upstream stages). Exhaust gas temperature steadily decreases at each stage (plot 602) and the decrease in exhaust gas temperature at each stage increases slightly for each stage (plot 604). Additionally, the coolant inlet temperature (plot 608) and coolant outlet temperature (plot 610) remains relatively constant at each stage. In the example shown in FIG. 6, the flow of coolant to each of the serially arranged stages (stages 2-6) may be controlled to maintain relatively constant heat transfer at each stage (similar to Mode 2 shown in FIG. 4). However, in alternate examples, the flow of coolant to each stage may be controlled differently, such as to maintain relatively equal gas temperature reduction at each stage (e.g., Mode 1 shown in FIG. 4) or relatively equal coolant temperature increase at each stage (e.g., Mode 3 shown in FIG. 4).

FIG. 7 shows a flow chart of a method 700 for operating a multistage exhaust cooler (e.g., EGR cooler, such as one of the EGR coolers shown in FIGS. 2 and 5) to maintain controlled heat transfer, exhaust gas temperature drop, and/or coolant temperature increase across each stage of the multistage exhaust cooler. For example, a rate or amount of coolant flow flowing through each stage of the cooler may be controller via a controller (such as controller 110 shown in FIG. 1) to maintain a relatively equal or controlled heat transfer, exhaust gas temperature drop, and/or coolant temperature increase across each stage in order to reduce thermal stress at the upstream end of the cooler (e.g., cooling tubes in the first stage). Instructions for carrying out at least a portion of method 700 may be executed by a controller based on instructions stored on a memory of the controller and in conjunction with signals received from sensors of the engine system, such as the sensors described above with reference to FIGS. 1, 2 and 5. The controller may employ engine actuators of the engine system to adjust engine operation, according to the methods described below, such as adjusting an actuator of a flow control element, or valve, coupled to coolant inlets of the cooler (such as flow control valves 230 shown in FIG. 2).

At 702, the method includes flowing exhaust gas into an exhaust gas inlet of an EGR cooler, across an exterior of cooling tubes of the EGR cooler, from one stage to another, and out an exhaust gas outlet of the EGR cooler. For example, this may include flowing exhaust gas through (e.g., around and past) a first set of cooling tubes of a first stage, then flowing exhaust gas through a second set of cooling tubes of a second stage, and so on until the exhaust gas flows through all stages of the EGR cooler (as shown in FIG. 2). In another example, this may include flowing exhaust gas first through two or more stages arranged in parallel with one another and then through a plurality of serially arranged stages (as shown in FIG. 5). As another example, the flowing exhaust gas at 702 may include flowing the exhaust gas at a relatively constant flow rate through each stage of the EGR cooler. The flow rate of exhaust entering the EGR cooler may be set by the controller, based on the engine operating condition, by actuating an EGR valve disposed upstream of the exhaust gas inlet of the EGR cooler into a desired position.

At 704, the method includes flowing coolant from a common coolant source to a coolant inlet (e.g., coolant inlets 226 shown in FIG. 2 and coolant inlets 524 shown in FIG. 5) of each stage of the EGR cooler, through an interior of cooling tubes of each stage, out a coolant outlet of each stage (e.g., coolant outlets 228 shown in FIG. 2 and coolant outlets 526 shown in FIG. 5), and back to the common coolant source. In this way, the temperature of coolant entering the cooling tubes of each stage may be approximately the same temperature.

At 706, the method includes controlling the flow of coolant to each stage of the EGR cooler to maintain one or more of an equal (or relatively equal, within a given tolerance range) coolant temperature increase across each stage, an equal (or relatively equal) gas temperature decrease across each stage, and an equal (or relatively equal) gas heat removal across each stage. As one example, relatively (or about) equal may include the chosen temperature change or heat transfer value for each stage being within a threshold percentage or tolerance range of a desired or average value, such as in a range of 1-3%. In other examples, the range may be smaller, such as 0.5-2%. In still other examples, the tolerance range or percentage range of the coolant temperature, gas temperature, or heat removal values for each stage may be greater than 3% or less than 1%, but still small enough that the values for each stage are relatively equal to one another. In one example, the method at 706 may include controlling a flow of coolant to at least a first stage of multiple stages of the cooler relative to a second stage of the multiple stages to maintain at least one of: a controlled amount of heat removal from the first stage relative to the second stage; an about equal coolant temperature increase across the first stage relative to the second stage; an about equal gas temperature decrease across the first stage relative to the second stage; and an about equal gas heat removal across the first stage relative to the second stage. In another example, this may include individually controlling the flow of coolant to each stage of the multiple stages to maintain the above-described cooling parameters. In another example, the method at 706 may include maintaining set and controlled, but not necessarily the same, heat transfer, exhaust gas temperature drop, or coolant temperature increase at each stage. For example, a first heat transfer amount may be set for a first, upstream stage arranged proximate to the exhaust gas inlet of the EGR cooler while a second heat transfer amount, which is greater than the first amount, may be set for a second stage arranged downstream from the first stage.

As one example, controlling the flow of coolant may include adjusting the position, amount of opening, or duration of opening (e.g., while modulating between open and closed positions) of a flow control element positioned in a coolant inlet of each stage (e.g., such as flow control elements 230 shown in FIG. 2). For example, a controller may actuate an actuator of each flow control element of each stage to individually control the amount or flow rate of coolant entering the stage which the flow control element is coupled to. For example, it may first be determined whether to maintain a relatively constant coolant temperature increase, amount of heat transfer, or exhaust gas temperature drop across each stage of the EGR cooler (e.g., based on instructions stored on memory of the controller). Then, the controller may determine the desired coolant flow amount or flow control element position to achieve the desired heat transfer or temperature drops at each stage based on one or more of an inlet temperature of the coolant, a flow rate of exhaust gas through the EGR cooler, a heat transfer area of each stage, and heat transfer coefficients for the exhaust gas and coolant. For example, the method at 706 may include adjusting the position of the flow control elements at the coolant inlet of each stage based on a desired heat transfer amount, coolant temperature increase, and/or exhaust gas temperature drop across each stage of the EGR cooler, which may be set within the controller and/or determined based on an inlet temperature of the coolant, a temperature of exhaust gas entering the cooler, and/or a flow rate of exhaust gas through the EGR cooler (and also using known variables such as heat transfer coefficients and heat transfer areas, as described above). For example, the controller may determine a control signal to send to the flow control valves, such as a position or duration of opening, determined based on the desired heat transfer or temperature difference values, inlet coolant temperature, inlet exhaust temperature, and/or flow rate of exhaust gas through the EGR cooler. The inlet coolant temperature, inlet exhaust gas temperature, and exhaust gas flow rate may be based on a measured inlet coolant temperature, measured inlet exhaust temperature, and/or measured exhaust gas flow rate. The controller may determine the individual positions of each of the flow control elements at the coolant inlets of each stage through a determination that directly takes into account the determined coolant inlet temperature, exhaust gas inlet temperature, and exhaust gas flow rate. The controller may alternatively determine the position or amount of opening of the flow control elements based on a calculation using a look-up table with the inputs being the desired heat transfer or temperature difference values, coolant inlet temperature, exhaust gas inlet temperature, and exhaust gas flow rate, and the output being flow control element position or amount of opening and/or the duration of opening.

As one example, the amount of coolant flow entering a first, most upstream stage of the EGR cooler may be reduced relative to the amount of coolant flow entering more downstream stages of the EGR cooler in order to maintain the desired heat transfer amount, coolant temperature increase, or exhaust gas temperature drop at each stage to reduce the thermally induced stresses at the tube-to-tube sheet interface and/or tube-to-fin interface.

In an alternate embodiment, in addition to or instead of controlling coolant flow through the individual stages of the EGR cooler, the number of cooling tubes and/or fin density may be chosen to maintain the relatively equal heat transfer amounts, exhaust gas temperature drops, or coolant temperature increases.

Continuing to 708, the method includes, while controlling the flow of coolant to each stage at 706, maintaining a constant flow rate of exhaust gas through each stage. For example, exhaust gas may enter the cooler at a set rate (which may change over time, during engine operation) and the exhaust gas may flow through each stage of the cooler at the same rate (e.g., due to the stages being arranged in series with one another). The method then ends.

In this way, the thermal stress at a front (inlet) end of the cooler may be reduced. This may reduce thermal expansion and degradation of cooling tubes at the inlet end of the cooler.

Figure 8:
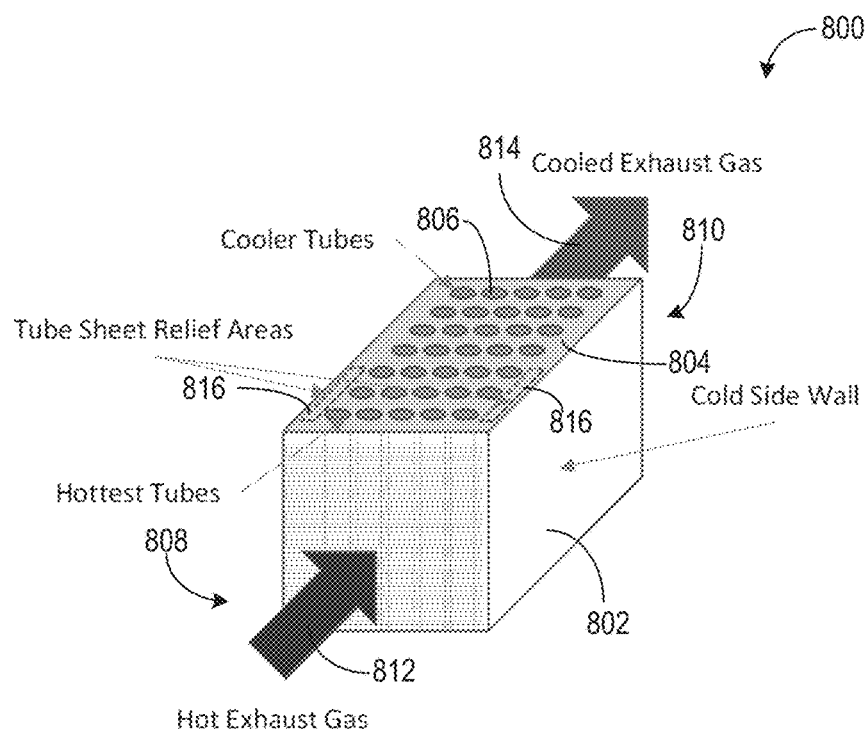
FIG. 8 shows a schematic of an exhaust gas cooler including one or more flexible regions on a tube sheet of the cooler, according to an embodiment of the invention.

Turning to FIG. 8, a schematic of an exhaust gas cooler (EGR cooler) 800 including one or more flexible areas on a tube sheet of the cooler is shown. The cooler 800 includes outer sidewalls 802 that are part of the housing of the cooler. Between the outer sidewalls, two tubes sheets 804 are arranged at opposite ends of the sidewalls (e.g., only a top tube sheet is shown in FIG. 8). In one example, the sidewalls are directly welded to the tubes sheets. A plurality of cooling tubes 806 of the cooler are coupled between the tube sheets. Specifically, a first end of each cooling tube is coupled to a first tube sheet and a second end of each cooling tubes is coupled to a second tube sheet. As such, the cooling tubes extend between the tube sheets within the cooler. The cooling tubes are arranged between an upstream, inlet end 808 of the cooler and a downstream, outlet end 810 of the cooler. Hot exhaust gas 812 enters the inlet end of the cooler, cools via the cooling tubes as it travels through the cooler, and then cooled exhaust gas 814 exits the outlet end of the cooler.

The cooling tubes arranged closest to the cooler sidewalls in the tube sheet may be mechanically constrained by the stiffness of the tube sheet and the sidewall. For example, thermal growth of the cooling tubes may be constrained by the colder sidewall, resulting in higher thermal forces developing in the cooling tubes arranged nearest the sidewall, especially at the inlet end of the cooler (where hot exhaust gas enters the cooler). A stiff connection between the hot cooling tubes and the cold sidewall may result in high thermal loads on the cooling tubes nearest the sidewalls. The thermal load on the tubes may be carried by the weld joint to the tube, which may result in fatigue degradation.

Thus, as shown in FIG. 8, flexible regions 816 may be added to the tube sheets to relieve this thermal load. The flexible regions may add flexibility or compliance to the tube sheet in the area in which they are arranged. As one example, the flexible regions may be comprised of a more flexible material than the rest of the tube sheet. As another example, the flexible regions may include a plurality of spring-like elements or may be comprised of a thinner material than the rest of the tube sheet, thereby increasing the compliance and flexibility of the flexible regions.

Figure 9:
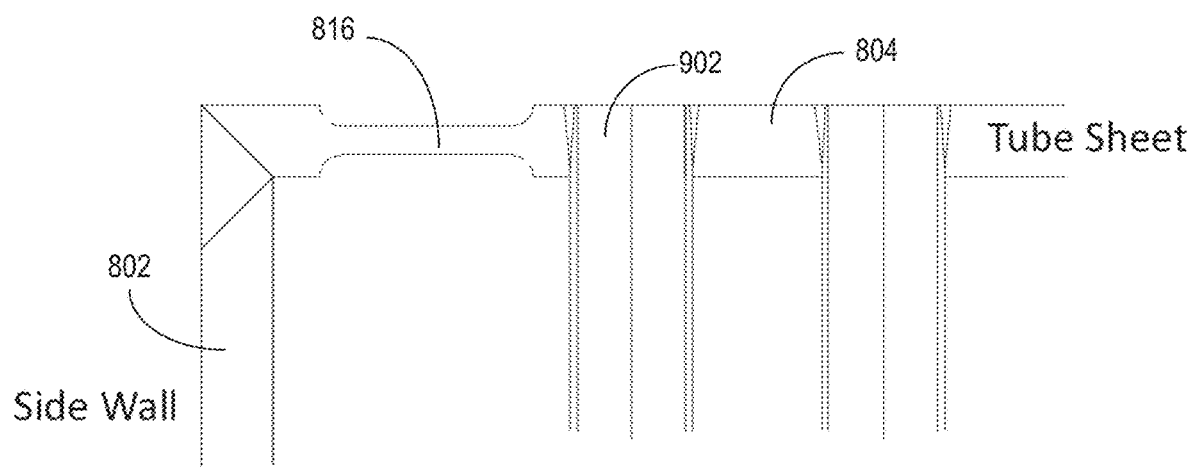
FIG. 9 shows a sectional, front view of the exhaust cooler of FIG. 8, zooming in on the junction between a sidewall and a tube sheet including a flexible region, according to an embodiment of the invention.

FIG. 9 shows a sectional front view of the cooler, zooming in on the junction between the sidewall 802 and the tube sheet 804 including a flexible region 816. Specifically, as seen in FIG. 9, the flexible region is arranged between the sidewall and a first cooling tube 902 coupled with the tube sheet. The flexible region adds flexibility to the tube sheet, thereby allowing the cooling tubes to expand without putting excessive and/or abnormal stress on the tube sheet-sidewall junction. In this way, degradation to the housing of the cooler may be reduced. The tube sheet embodiments shown in FIGS. 8 and 9 may be incorporated into the coolers shown in FIGS. 2 and 5.

FIGS. 2, 5, 8, and 9 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The technical effect of controlling a flow of coolant to at least a first stage of a plurality of stages of an exhaust gas cooler relative to a second stage of the plurality of stages to maintain at least one of: a controlled amount of heat removal from the first stage relative to the second stage; an about equal coolant temperature increase across the first stage relative to the second stage; an about equal gas temperature decrease across the first stage relative to the second stage; and/or an about equal gas heat removal across the first stage relative to the second stage is to reduce thermal stress at the first stage of the exhaust gas cooler, thereby reducing cooling tube degradation and increasing a longevity of the cooler.

In an embodiment, a method includes receiving, at a controller of an engine system, sensor signals from one or more sensors coupled to an exhaust gas cooler of the engine system. For example, the sensor signals may be indicative of one or more temperatures, pressures, and/or flow rates, etc. associated with: components of the exhaust gas cooler; exhaust gas flowing into, through, or out of the exhaust gas cooler; and/or coolant of the exhaust gas cooler. The method further includes, with the controller, and based at least in part on the received sensor signals, generating control signals that are communicated to one or more flow control elements operably coupled to the exhaust gas cooler, to control a flow of the coolant to at least a first stage of a plurality of stages of the exhaust gas cooler relative to a second stage of the plurality of stages to maintain at least one of: a controlled amount of heat removal from the first stage relative to the second stage; an about equal coolant temperature increase across the first stage relative to the second stage; an about equal gas temperature decrease across the first stage relative to the second stage; and/or an about equal gas heat removal across the first stage relative to the second stage. In other embodiments, the method further includes one or more additional method steps or processes as set forth herein.

In an embodiment, a system includes an exhaust gas cooler and a controller. The exhaust gas cooler includes a housing with an exhaust gas inlet and exhaust gas outlet, and a plurality of serially arranged stages positioned between the exhaust gas inlet and exhaust gas outlet (e.g., within the housing). Each stage of the plurality of serially arranged stages respectively includes a plurality of cooling tubes coupled between a coolant inlet and coolant outlet. The controller is configured to generate control signals to adjust a flow of coolant to the coolant inlet of each stage of the plurality of serially arranged stages in order to maintain at least one of an about equal coolant temperature increase across each stage, an about equal gas temperature decrease across each stage, and/or about equal gas heat removal across each stage. The controller may be configured to generate the controls signals based on received temperature, pressure, and/or flow signals (e.g., received from one or more sensors operably coupled to the exhaust gas cooler), and the control signals may be for controlling one or more flow control elements (e.g., valves) of the exhaust gas cooler.

In yet another embodiment, an exhaust gas recirculation (EGR) cooler comprises: an exhaust gas inlet spaced away from an exhaust gas outlet; a first stage arranged in parallel with a second stage, each of the first stage and the second stage including a plurality of cooling tubes coupled between a respective coolant inlet and coolant outlet of each of the first stage and second stage; and a plurality of secondary stages arranged in series with one another and downstream of each of the first stage and the second stage, where exhaust gas exiting the first stage and second stage enters a first secondary stage of the plurality of secondary stages. In one example, each secondary stage of the plurality of secondary stages includes its own coolant inlet and coolant outlet with a plurality of cooling tubes coupled between the coolant inlet and coolant outlet, where each coolant inlet of each secondary stage is coupled to a common coolant source, and where the coolant inlet of each of the first stage and second stage is coupled to the common coolant source. In another example, the plurality of secondary stages includes a second secondary stage positioned downstream from the first secondary stage and where an exhaust gas inlet of the second secondary stage is directly coupled to an exhaust gas outlet of the first secondary stage.

As still another embodiment, a method comprises: with plural temperature sensors operably coupled to an exhaust gas cooler, generating temperature signals indicative of respective temperatures of at least a first stage of a plurality of stages of the exhaust gas cooler and a second stage of the plurality of stages; with a controller, receiving the temperature signals; and with the controller, based on the received temperature signals, controlling plural flow control elements operably coupled to the exhaust gas cooler to control a flow of coolant to at least the first stage of the plurality of stages of the exhaust gas cooler relative to the second stage of the plurality of stages to maintain at least one of: a controlled amount of heat removal from the first stage relative to the second stage; an about equal coolant temperature increase across the first stage relative to the second stage; an about equal gas temperature decrease across the first stage relative to the second stage; and/or an about equal gas heat removal across the first stage relative to the second stage.

As another embodiment, a system for an exhaust gas cooler comprises: an exhaust gas inlet and exhaust gas outlet; a plurality of serially arranged stages positioned between the exhaust gas inlet and exhaust gas outlet, each stage of the plurality of serially arranged stages including a plurality of cooling tubes coupled between a coolant inlet and coolant outlet; a plurality of temperature sensors including one or more of a temperature sensor positioned at the exhaust gas inlet, a temperature sensor positioned at the exhaust gas outlet, a temperature sensor positioned upstream of the coolant inlet of each stage, a temperature sensor positioned at the coolant outlet of each stage, and/or a temperature sensor positioned between an interface between each stage; a plurality of flow control elements, where each flow control element of the plurality of flow control elements is coupled to the coolant inlet of each stage; and a controller with computer readable instructions stored in memory for: receiving temperature signals from the plurality of temperature sensors and adjusting a flow of coolant to the coolant inlet of each stage of the plurality of serially arranged stages, via the plurality of flow control elements (e.g., via sending a control signal to the plurality of flow control elements), and based on the received temperature signals, in order to maintain at least one of an about equal coolant temperature increase across each stage, an about equal gas temperature decrease across each stage, and/or an about equal gas heat removal across each stage.

As yet another embodiment, a method comprises: with a controller, via one or more control elements or valves, selectively directing exhaust gas to two or more exhaust coolers; with plural temperature sensors operably coupled to the two or more exhaust coolers, generating temperature signals indicative of respective temperatures of a plurality of stages of at least one of the two or more exhaust coolers; with the controller, receiving the temperature signals; and with the controller, controlling plural flow control elements operably coupled to the two or more exhaust coolers to control a flow of coolant through each stage of the plurality of stages of the at least one of the two or more exhaust coolers to maintain one of a relatively equal coolant temperature increase across each stage, a relatively equal gas temperature decrease across each stage, or a relatively equal gas heat removal across each stage.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This written description uses examples to disclose the invention, including the best mode, and also to enable a person of ordinary skill in the relevant art to practice the invention, including making and using any devices or systems and performing any incorporated methods.

The invention claimed is:

1. A method, comprising:
   individually adjusting an amount or flow rate of coolant entering a coolant inlet of at least a first stage of a plurality of stages of an exhaust gas cooler relative to a second stage of the plurality of stages with a controller and at least one valve,
   the one or more individual adjustments based on inputs to the controller from temperature sensors at each stage and, the one or more individual adjustments maintaining at least one of: a controlled amount of heat removal from the first stage relative to the second stage; an about equal coolant temperature increase across the first stage relative to the second stage; an about equal gas temperature decrease across the first stage relative to the second stage; or an about equal gas heat removal across the first stage relative to the second stage.

2. The method of claim 1, wherein the plurality of stages is positioned between an exhaust gas inlet and an exhaust gas outlet of the exhaust gas cooler and wherein each stage includes a plurality of cooling tubes positioned between a coolant inlet and a coolant outlet of each stage.

3. The method of claim 1, wherein each stage of the plurality of stages is arranged in series with another one of the plurality of stages, in a direction of gas flow from an exhaust gas inlet to an exhaust gas outlet of the exhaust gas cooler.

4. The method of claim 1, wherein controlling the flow of coolant comprises controlling the flow rate or the amount of coolant entering a coolant inlet of each stage.

5. The method of claim 4, wherein the coolant inlet of each stage is coupled to a common coolant source and wherein a temperature of coolant entering the coolant inlet of each stage is at a relatively same temperature.

6. The method of claim 1, wherein controlling the flow of coolant to at least the first stage includes controlling a position or amount of opening of a plurality of flow control elements, wherein each flow control element of the plurality of flow control elements is coupled to a coolant inlet of each stage.

7. The method of claim 6, wherein the plurality of flow control elements is a plurality of valves that are individually actuatable by a controller of an engine system in which the exhaust gas cooler is installed.

8. The method of claim 1, wherein controlling the flow of coolant includes adjusting the flow of coolant to at least the first stage while flowing coolant through a plurality of cooling tubes of each stage and flowing exhaust gas into an exhaust gas inlet of the exhaust gas cooler, across and around an exterior of the plurality of cooling tubes of each stage, and out an exhaust gas outlet of the exhaust gas cooler, wherein flowing exhaust gas across the exterior of the plurality of cooling tubes of each stage includes flowing exhaust gas, in series, through each stage of the plurality of stages.

9. The method of claim 1, further comprising A method, comprising:
individually adjusting an amount or flow rate of coolant entering a coolant inlet of at least a first stage of a plurality of stages of an exhaust gas cooler relative to a second stage of the plurality of stages with a controller and at least one valve,
the one or more individual adjustments based on inputs to the controller from temperature sensors at each stage, and the one or more adjustments maintaining at least one of: a controlled amount of heat removal from the first stage relative to the second stage; an about equal coolant temperature increase across the first stage relative to the second stage; an about equal gas temperature decrease across the first stage relative to the second stage; and an about equal gas heat removal across the first stage relative to the second stage; and
individually adjusting the flow of coolant to each stage to maintain about equal gas temperature decrease across each stage and wherein individually adjusting the flow of coolant to each stage to maintain about equal gas temperature decrease across each stage includes individually adjusting the amount or flow rate of coolant entering the coolant inlet of each stage to maintain about equal heat transfer from exhaust gas to coolant flowing through each stage, the exhaust gas traveling from a gas inlet end to a gas outlet end of each stage.

10. The method of claim 1, further comprising while controlling the flow of coolant to at least the first stage, maintaining a constant flow rate of exhaust gas through each stage.

11. A system for an exhaust gas cooler, comprising:
an exhaust gas inlet and an exhaust gas outlet;
a plurality of serially arranged stages positioned between the exhaust gas inlet and the exhaust gas outlet, each stage of the plurality of serially arranged stages including a plurality of cooling tubes coupled between a coolant inlet and a coolant outlet; and
a controller with computer readable instructions stored in memory for:
individually adjusting an amount or flow rate of coolant to the coolant inlet of each stage of the plurality of serially arranged stages with valves, the individual adjustments based on inputs of temperature sensors positioned at each exhaust gas outlet and/or coolant outlet in order to maintain at least one of an about equal coolant temperature increase across each stage, an about equal gas temperature decrease across each stage, and an about equal gas heat removal across each stage.

12. The system of claim 11, further comprising a plurality of split flow stages arranged upstream of the plurality of serially arranged stages, between the exhaust gas inlet and the exhaust gas outlet, wherein the plurality of split flow stages is arranged in parallel with one another and each stage of the plurality of split flow stages includes a plurality of cooling tubes coupled between the coolant inlet and the coolant outlet.

13. The system of claim 12, wherein each stage of the plurality of split flow stages is arranged in series with the plurality of serially arranged stages, with respect to a direction of gas flow from the exhaust gas inlet to the exhaust gas outlet, and wherein each stage of the plurality of split flow stages is directly coupled to the exhaust gas inlet.

14. The system of claim 12, wherein exhaust gas flows over an exterior of the plurality of cooling tubes of each stage and coolant flows through an inside of the plurality of cooling tubes of each stage.

15. The system of claim 12, wherein the plurality of split flow stages includes two stages and the plurality of serially arranged stages includes at least three stages.

16. The system of claim 11, wherein a number of cooling tubes in each stage of the plurality of serially arranged stages is equal.

17. The system of claim 11, wherein a number of cooling tubes in at least one stage of the plurality of serially arranged stages is different than a number of cooling tubes in another stage of the plurality of serially arranged stages.

18. The system of claim 11, wherein the exhaust gas outlet is spaced away from the exhaust gas inlet and wherein the plurality of serially arranged stages includes at least three stages arranged in series with one another, between the exhaust gas inlet and the exhaust gas outlet.

19. A method, comprising:
selectively directing exhaust gas to two or more exhaust coolers;
receiving signals at a controller from temperature sensors of each stage positioned at each coolant outlet and/or exhaust gas outlet; and
sending signals with the controller to individually adjust a flow rate or amount of coolant through each stage of a plurality of stages of at least one of the two or more exhaust coolers to maintain one of a relatively equal coolant temperature increase across each stage, a relatively equal gas temperature decrease across each stage, or a relatively equal gas heat removal across each stage.

20. The method of claim 19, wherein the plurality of stages is positioned between an exhaust gas inlet and an exhaust gas outlet of the at least one of the two or more exhaust coolers, and wherein each stage includes a plurality of cooling tubes positioned between a coolant inlet and the coolant outlet of each stage.

* * * * *